United States Patent
Gräff

Patent Number: 5,915,816
Date of Patent: Jun. 29, 1999

[54] METHOD AND APPARATUS FOR PREPARING AN ADSORBENT

[76] Inventor: Roderich W. Gräff, Domaqkweg 7, 78126 Königsfeld, Germany

[21] Appl. No.: 08/851,270

[22] Filed: May 5, 1997

[30] Foreign Application Priority Data

May 3, 1996 [EP] European Pat. Off. .............. 96107024

[51] Int. Cl.$^6$ ....................................................... F26B 7/00
[52] U.S. Cl. ................................. 34/378; 34/391; 34/474; 34/507; 95/113; 95/125
[58] Field of Search .................... 34/80, 81, 82, 34/473, 472, 474, 378; 95/113, 125

[56] References Cited

U.S. PATENT DOCUMENTS

| | | |
|---|---|---|
| 4,030,896 | 6/1977 | Wimber et al. . |
| 4,336,159 | 6/1982 | Winter . |
| 4,858,335 | 8/1989 | Roth . |
| 5,688,305 | 11/1997 | Graeff . |

FOREIGN PATENT DOCUMENTS

| | | |
|---|---|---|
| 2124228 | 11/1994 | Canada . |
| 266684 | 5/1988 | European Pat. Off. . |
| 6266244 | 11/1994 | European Pat. Off. . |
| 2307567 | 11/1976 | France . |
| 2464744 | 3/1981 | France . |
| 43 17 768 | 12/1994 | Germany . |
| 57-094321 | 6/1982 | Japan . |
| 58-170518 | 10/1983 | Japan . |

*Primary Examiner*—Henry A. Bennett
*Assistant Examiner*—Pamela A. Wilson
*Attorney, Agent, or Firm*—Jacobson, Price, Holman & Stern, PLLC

[57] ABSTRACT

A method of preparing an adsorbent which contains a medium, which medium may comprise water. The medium is removed from the adsorbent by a hot regeneration gas, and the adsorbent is then cooled, wherein heat recovered during said cooling is used to heat the regeneration gas in a heat accumulator/exchanger. In order to improve the dewpoint characteristics of the dried gas, the adsorbent is passed successively through the following zones:

an adsorption zone in which the adsorbent adsorbs the given medium;

a regeneration zone in which the regeneration gas is passed through the adsorbent; and a cooling zone in which heat is withdrawn from the adsorbent, to be transferred to the heat accumulator/exchanger. An apparatus suitable for carrying out the described method is also described.

8 Claims, 1 Drawing Sheet

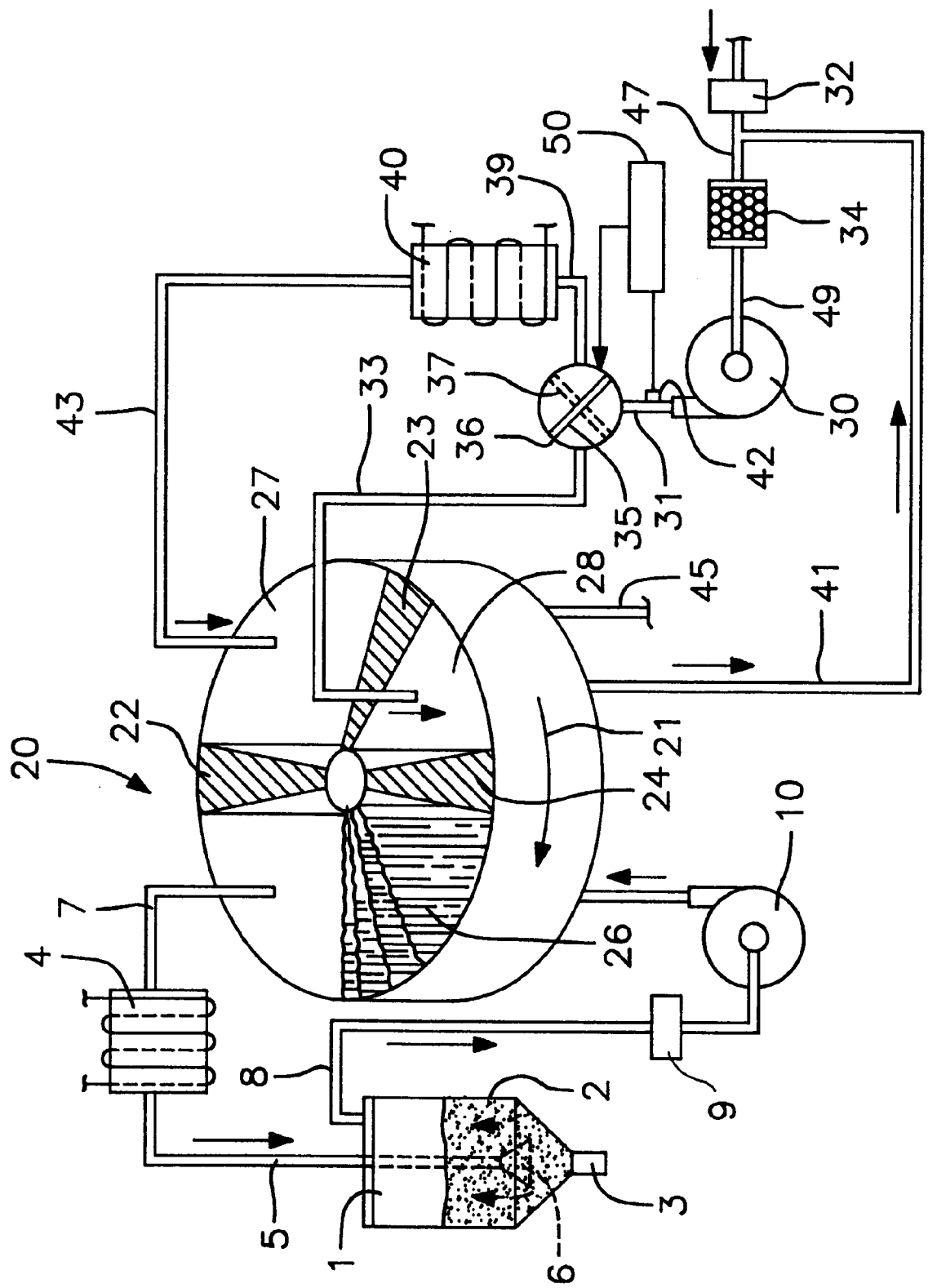

METHOD AND APPARATUS FOR PREPARING AN ADSORBENT

The invention relates to a method of preparing an adsorbent which contains a medium, which medium may comprise water, whereby the medium is removed from the adsorbent by a hot regeneration gas, and the adsorbent is then cooled, wherein heat recovered during said cooling is used to heat the regeneration gas in a heat accumulator/exchanger. The invention also relates to an apparatus for carrying out the method.

DE-A-43 17 768 describes vessels intended to accommodate an adsorbent, which vessels are transported stepwise through an adsorption zone, a regeneration zone, and a cooling zone. A given vessel containing freshly regenerated and cooled adsorbent is promptly recycled to the adsorption zone. A given vessel containing adsorbent saturated with moisture is transported from the adsorption zone to the regeneration zone. The method is carried out with the vessels disposed, e.g., on a carousel. A disadvantage of this stepwise method is that the dewpoint of the gas dried will vary as the carousel is advanced in stepwise rotation.

Canadian Pat. 2,124,228 discloses the use of a rotor instead of a vessel disposed on a carousel. The adsorbent is fixed to the rotor, and is carried continuously by the rotor through the adsorption zone, regeneration zone, and cooling zone, which zones are stationary. The regeneration and cooling of the adsorbent are carried out simultaneously. External air drawn through a blower is passed to the cooling zone, or such external air is heated to the regeneration temperature by a heating device, following which it is advanced as regeneration gas. A drawback of this method is that the freshly regenerated adsorbent is exposed to the humidity of the external air. A heat accumulator/exchanger may be employed to avoid this drawback, wherein regeneration and cooling occur in succession in a single "zone", wherein the rotor is stopped from time to time, to allow a given portion of adsorbent to be first heated and then cooled. The intermittent stoppage of the rotor has the disadvantage, again, that the dewpoint of the dried air will necessarily fluctuate as the rotor is advanced in the next step-advance. Also, two control valves are required, which increases the capital cost and engineering cost of the system. The heat accumulator/exchanger must be relatively large, since it must absorb the entire amount of heat released from the rotor segment in a very short cooling time.

Accordingly, the underlying problem of the present invention is to devise means of preparing an adsorbent such that the dewpoint of the dried gas is kept as constant as possible and the capital cost of the system is minimized.

This problem is solved according to the invention in that, in a method of the type described initially supra, the adsorbent is passed successively through the following zones:

an adsorption zone in which the adsorbent adsorbs the given medium;

a regeneration zone in which the regeneration gas is passed through the adsorbent; and a cooling zone in which heat is withdrawn from the adsorbent, and the heat is transferred to the heat accumulator/exchanger.

With this arrangement, the dewpoint of the dried air is maintained nearly constant. In an advantageous embodiment of the invention, the blower itself is used as a heat accumulator/exchanger. Preferably the adsorbent is moved continuously through the adsorption zone, regeneration zone, and cooling zone. It is also recommended that a cooling gas be passed in a recirculation loop through the cooling zone, heat accumulator/exchanger, and blower; and that a switchover from cooling to regeneration be made when the cooling gas leaving the heat accumulator/exchanger has a temperature which exceeds a prescribed value. Advantageously, the regeneration time is chosen to be twice as long as the cooling time, for the adsorbent passing through the regeneration zone and cooling zone. If the regeneration period and cooling period are kept very short, the dimensions of the heat accumulator/exchanger can be kept small. In that case the switchover from cooling to regeneration and back can be controlled with a single temperature sensor. Due to the low temperatures to be measured, the sensor can be simple. The general process control system can be simple compared to the prior art.

An apparatus to solve the stated underlying problem comprises an apparatus for preparing an adsorbent which adsorbent contains a medium, which medium may comprise water, said apparatus having a rotor which rotor has an adsorption zone, a regeneration zone, and a cooling zone, and which rotor accommodates the adsorbent, and said apparatus further having a filter, a heat accumulator/exchanger, a blower, and a heating device, disposed in sequence in the flow of gas, wherein a regeneration gas supply line leads from the heating device to the regeneration zone, and second gas line leads from the rotor to the line connecting the filter to the heat accumulator/exchanger, and wherein a switchover valve is disposed in a cooling gas supply line from the blower to the cooling zone, and the second gas line carries the cooling gas exiting from the cooling zone.

Additional preferred embodiments and refinements of the invention are set forth in the dependent claims.

The invention will be described in more detail hereinbelow, with the aid of an exemplary embodiment illustrated in the accompanying drawing consisting of a single FIGURE.

The FIGURE shows a cellular "honeycomb" dryer 20 in rotor form, for drying of humid air exiting from a funnel-bottom drying vessel 1 containing a charge 2 of plastic granulate which granulate is introduced continuously or intermittently from above. After the granulate is dried it exits the vessel 1 through an outlet opening 3 at the bottom.

The drying air for drying the granulate 2 is supplied to vessel 1 through a line 5 which extends through the top of vessel 1 and terminates in a diffusor 6 near the outlet opening 3. The drying air is first heated in a heater 4 to the required temperature of 80° C. or higher. The drying air from drying air supply line 5 flows through charge 2 in the vessel 1 from the bottom upward, and exits through exit line 8 at the cover of vessel 1. The exhaust air carrying moisture from vessel 1 is delivered through line 8 to a filter 9 and then to a blower 10 which forces the air to the honeycomb dryer 20. The rotor of dryer 20 rotates in the direction of arrow 21, at a speed of c. about 1–3 revolutions per hour. The cells of the dryer are comprised of a corrugated paper or fiberglass coated with a molecular sieve material, as the adsorbent. These cells are separated into three zones by three stationary sealing strips (22, 23, 24).

In the adsorption zone 26, the moisture carried in the air from blower 10 flowing through the zone is adsorbed on the adsorbent. The dried air leaving the adsorption zone 26 is passed through air feed line 7 to the heater 4. In the regeneration zone 27, the adsorbent is regenerated by hot regeneration gas, whereby moisture held in the adsorbent is driven off from the adsorbent. The cooling zone 28 follows the regeneration zone 27 in the direction of rotation 21 of the rotor. In said cooling zone the adsorbent is exposed to cooling air, whereby the heated adsorbent coming from the regeneration zone 27 is cooled to a temperature at which the molecular sieve material can effectively adsorb moisture. The drive mechanism (not shown) for the honeycomb dryer 20 may be, e.g., an electrical friction wheel drive.

To provide hot regeneration gas for the reaction zone 27, external air is drawn in by a blower 30 through a filter 32 followed by a heat accumulator/exchanger 34. A delivery line 31 extends from blower 30 to a two-position switchover valve 36. In a first position (shown as solid path 35), valve 36 connects the delivery line 31 from blower 30 to a cooling air supply line 33 which leads to the cooling zone 28 of the rotor. In the second position (shown as dotted-line path 37), valve 36 connects gas delivery line 31 to a gas line 39 leading to a heating device 40 from the outlet of which a regeneration gas supply line 43 leads to the regeneration zone 27 of the rotor 20. A regeneration exhaust line 45 exhausts the gas from the regeneration zone 27 to the atmosphere. A cooling air exit line 41 leads from the cooling zone 28 to the gas line 47 connecting the filter 32 to the heat accumulator/exchanger 34.

A temperature sensor 42 is disposed in the gas delivery line 31 from the blower 30. The signal from sensor 42 is sent to a control device 50 where it undergoes processing. Control device 50 is connected to switchover valve 36 via an actuation link.

To regenerate the moisture-saturated adsorbent, e.g. molecular sieve material, which is rotated from the adsorption zone 26 to the regeneration zone 27, the blower 30 draws in external air via filter 32 and heat accumulator/exchanger 34. If the heat accumulator/exchanger 34 has accumulated heat from the previously accomplished cooling of adsorbent, the external air is preheated in the heat accumulator/exchanger 34 to a temperature which is closer to the regeneration temperature. Valve 36 is in position 37, and the heating device 40 is in operation, whereby the external air is heated in device 40 to the regeneration temperature of c. about 250° C. and is supplied to the regeneration zone 27 via the regeneration supply line 43. As the adsorbent is moved through the regeneration zone 27 in the direction of arrow 21, it is regenerated. When the adsorbent leaves the regeneration zone 27 it is in the hot regenerated condition. At the end of the regeneration [step], the heat accumulator/exchanger [34] is cold.

To cool the hot adsorbent in the cooling zone 28, the controller 50 switches the valve 36 to position 35, whereby air from line 31 is carried via cooling air supply line 33 to the cooling zone 28, where it passes through the adsorbent and picks up heat therefrom, and is then delivered to heat accumulator/exchanger 34 via the lines 41 and 47. A suitable heat accumulator/exchanger is described in DE-A-43 17 768. In the heat accumulator/exchanger, heat is removed from the cooling air, and the air leaves the heat accumulator/exchanger 34 in a cold state, to be returned to the blower 30 via gas line 49. Thus the cooling air is recirculated numerous times through the loop comprised of the line 31, valve 36, line 33, cooling zone 28, lines 41 and 47, heat accumulator/exchanger 34, line 49, and blower 30. This continues until the temperature sensor 42 determines that the temperature on the delivery side of the blower begins to be greater than that of the external air. The controller 50 detects this temperature rise and immediately causes the valve 36 to be switched to position 37, whereupon regeneration of the adsorbent present in the regeneration zone 27 is continued. The heating of the adsorbent undergoing regeneration in regeneration zone 27, accompanied by the volatilization of the moisture adsorbed on the adsorbent, consumes more time than the cooling of the adsorbent in the cooling zone 28. Accordingly, the size of the regeneration zone 27 is maintained larger than the size of the cooling zone 28, e.g. by a factor of two. Alternatively, the treatment of the adsorbent in the regeneration zone 27 may be maintained for a longer time than the treatment of the adsorbent in the cooling zone 28. A ratio of 2:1 is typical.

The higher the frequency of switching over from cooling to regeneration and back, the smaller the fluctuations in the dewpoint of the product air in the air feed line 7. Typical times are, e.g., 2 minutes regeneration and 1 minute cooling. If these times are fixed, and if the quantity of regeneration air is fixed, one can dimension the heat accumulator/exchanger 34 such that it is practically completely cooled to room temperature within the (2 minute) regeneration period. Then during the subsequent shorter cooling phase of the rotor the heat accumulator/exchanger [34] will be heated only on its inlet side, wherein even at the end of the cooling phase the air drawn into the blower from the heat accumulator/exchanger will still be close to room temperature.

In the preceding description of the exemplary embodiment of the invention, the blower 30 and heat accumulator/exchanger 34 were described (and depicted in the FIGURE) as separate units. However, the blower 30 itself may serve as a heat accumulator/exchanger, obviating the need for a separate heat accumulator/exchanger unit. This is practicable as long as the amount of heat withdrawn from the adsorbent in the cooling zone 28 is small in relation to the heat accumulation capacity of the blower 30. Any blower or compressor (hereinafter, blower) customarily used in adsorption systems (particularly drying adsorption systems) is a candidate for this function, as long as it can tolerate the temperatures which will be employed. Depending on the adsorbent, the temperature at the end of the regeneration phase will be in the range of c. 80–250° C. Blowers constructed of metal material are preferred. The greater the heat accumulation capacity of the blower in relation to the amount of air conveyed, the greater the recuperative effect. Axial or radial blowers are suitable, particularly side-channel blowers; likewise axial or centrifugal compressors.

The invention is not limited to the use of molecular sieves as an adsorbent material. E.g., silica gel may be used. It is not necessary for the rotation of the rotor to be continuous; numerous small stepping movements are possible. In a variation of the arrangement shown in the FIGURE, the cooling air may be passed through the adsorbent in the direction opposite to that in which the regeneration gas is passed.

What is claimed is:

1. A method of preparing an adsorbent which contains a medium, whereby the medium is removed from the adsorbent by a hot regeneration gas, and the adsorbent is then cooled, wherein heat recovered during said cooling is used to heat the regeneration gas in a heat accumulator, comprising the following steps:

passing the adsorbent through an adsorption zone in which the adsorbent adsorbs the given medium;

passing the adsorbent, after the adsorption zone, through a regeneration zone in which the regeneration gas is passed through the adsorbent;

passing the adsorbent, after the regeneration zone, through a cooling zone in which heat is withdrawn from the adsorbent and transferring the withdrawn heat to the heat accumulator; and continuously advancing the adsorbent through said adsorption zone, regeneration zone, and cooling zone.

2. A method according to claim 1 wherein said heat accumulator is a blower.

3. A method according to claim 2 further comprising the step of passing a cooling gas in a recirculation loop through the adsorbent at the cooling zone, then to the heat accumulator, and then to said blower, and switching over from said cooling zone to passing said cooling gas through said adsorbent at said regeneration zone when the cooling gas leaving the heat accumulator has a temperature which exceeds a prescribed value.

4. A method according to claim 1 wherein the duration of the adsorbent passing through the regeneration zone is greater than the duration of the adsorbent passing through the cooling zone in a ratio of 2:1.

5. An apparatus for preparing an adsorbent which adsorbent contains a medium, said apparatus including a rotor having an adsorption zone, a regeneration zone, and a cooling zone, said rotor accommodating the adsorbent, said apparatus further including a filter, a heat accumulator connected to said filter through a first line, a blower, and a heating device disposed in a gas flow sequence wherein a regeneration gas supply line leads from said heating device to said regeneration zone, and a second gas line leads from the rotor to said first line, a switchover valve disposed in a cooling gas supply line from said blower to the cooling zone, wherein said second gas line carries cooling gas exiting from the cooling zone.

6. An apparatus according to claim 5 wherein said heat accumulator is integrated into the blower.

7. An apparatus according to claim 5, further comprising a temperature sensor disposed in a gas line on the outlet side of said heat accumulator, which sensor is connected to a controller for said switchover valve.

8. An apparatus according to claim 5, wherein said regeneration zone is larger than said cooling zone by a factor of two.

* * * * *